United States Patent

Vasek

[15] 3,698,248

[45] Oct. 17, 1972

[54] PRESSURE RESPONSIVE TRANSDUCER
[72] Inventor: Anthony G. Vasek, Pontiac, Mich.
[73] Assignee: The Bendix Corporation
[22] Filed: May 15, 1970
[21] Appl. No.: 37,716

[52] U.S. Cl. ............................................. 73/398 AR
[51] Int. Cl. .................................................. G01l 9/04
[58] Field of Search ............... 73/398 AR, 71.2, 71.4; 33/178 E

[56] References Cited

UNITED STATES PATENTS

3,303,572  2/1967  Vreeland, Jr. ............ 33/178 E
3,535,937  10/1970  Wiggins et al. ......... 73/398 AR

Primary Examiner—Donald O. Woodiel
Attorney—William F. Thornton and Plante, Hartz, Smith and Thompson

[57] ABSTRACT

A clamp-on pressure responsive transducer for measuring changes in pressure exerted on vibrating enclosures of regular cross section by detecting changes in cross sectional area of the enclosure which are caused by pressure and distinguishing them from variations in cross sectional geometrical shape of the enclosure which are caused by vibration. A plurality of sensors are positioned around the enclosure and pressure changes cause uniform changes in each sensor while vibration causes different changes in the sensors. These changes are detected and utilized to produce an output indicative of pressure changes independently of vibration of the enclosure.

15 Claims, 7 Drawing Figures

PRESSURE RESPONSIVE TRANSDUCER

BACKGROUND OF THE INVENTION

This invention relates to the field of pressure gages and comprises a transducer which measures changes in pressure on an enclosure to any desired degree of accuracy even when the enclosure is subject to extraneous vibrations which seriously limit the accuracy of many earlier pressure gages.

The term "extraneous vibrations," as used herein, includes most vibratory waves and acceleration effects common to enclosures which cause an enclosure to be deformed from its normal cross section. It includes wave phenomena commonly generated by causes such as vibrating machinery attached to or acceleration acting on the enclosure. It specifically does not include phenomena, such as pressure, which cause the enclosure as a whole to radially expand or alternatively, to radially contract.

It is well known that a pressure increase within an elastic enclosure causes the cross section of the enclosure to expand in proportion to the pressure increase. Correspondingly, the cross section of such an enclosure contracts proportionately in response to a decrease in pressure. This behavior has been utilized by many prior art pressure gages to measure pressure exerted on enclosures. The accuracy of pressure gages which function by measuring expansion and contraction of an enclosure, however, is often seriously reduced by extraneous vibrations which deform the cross section of the enclosure. Extraneous vibration distorts the cross sectional shape of the enclosure and the pressure gage records changes in cross section due to both extraneous vibration and pressure.

Gages which operate by measuring changes in enclosure cross section are often used for measuring pressure within pipes. Most pipes associated with vibrating machinery or accelerating vehicles exhibit vibratory behavior, and such vibration often introduces serious inaccuracies into the pressure measuring operation when prior art pressure gages are used. The prior art has essentially ignored the existence of extraneous vibrations on pipes and other enclosures, and pressure gages have been correspondingly inaccurate. My invention provides an apparatus which compensates for unwanted extraneous vibrations and thereby accurately measures pressure changes.

SUMMARY OF THE INVENTION

My invention comprises a transducer which is mountable on a wide variety of enclosures and which produces a response proportional to pressure exerted on the periphery of an enclosure without breaking into the enclosure. The response remains proportional to such pressure even when the cross sectional shape of the enclosure is deformed by extraneous vibrations produced by causes such as machinery or acceleration.

Using my invention one can accurately measure pressure in a vibrating enclosure such as a pipe. As pressure within the pipe increases, the cross sectional area of the pipe increases proportionately; as pressure decreases the cross sectional area of the pipe decreases proportionately. Extraneous vibrations common to pipes and most other enclosures, however, have no significant effect on the cross sectional area of the pipe; instead they deform the geometrical shape of the pipe's cross section. A round cross section pipe, for example, is often deformed by extraneous vibrations to take on an elliptical cross section, but the area of the ellipse will be substantially equal to the original cross sectional area of the round pipe.

My transducer produces a response proportional to changes in pressure by sensing changes in the cross sectional area of the enclosure and variations in geometrical shape of the cross section of the enclosure. Means are provided to distinguish changes in cross sectional area from variations in the geometrical shape. The changes in the cross sectional area of the enclosure are proportional to pressure exerted on the enclosure.

Vibrating pipes can be considered as vibrating in many different "modes." The lowest "mode," known as the "second mode" for reasons to be explained hereafter, tends to deform a pipe cross section into an ellipse. This "second mode" ordinarily has a larger amplitude than any higher mode. The "third mode" deforms a round cross section pipe in a different and nonelliptical fashion which will be shown hereafter. In theory, there are an infinite number of modes of vibration, all of which can be present simultaneously on a given pipe or other enclosure. After the first few modes, however, the amplitude of vibration of each "mode" decreases steadily with each successively higher "mode." "Modes" higher than the "third mode" can usually be ignored for practical measuring purposes. If one compensates for the effects of the second and third modes of vibration, an extremely accurate measurement is obtained. It should be understood, however, that if greater accuracy is needed, it is possible, using my invention, to obtain any desired degree of accuracy required; the principles of my invention permit one to compensate for as many modes of vibration as may be desired.

In the embodiments shown herein my invention has a plurality of sensors which measure the radial deformation of the enclosure at a number of points about the periphery of the enclosure. The sensors are attached to a frame which surrounds the enclosure. The number of sensors required for a given enclosure is determined by the cross sectional shape of the enclosure and the required degree of accuracy.

The sensors transmit the radial movement associated with the pipe deformation to the frame of the transducer, which is then correspondingly deformed.

Means are provided on the frame which distinguish variations in the geometrical shape of the cross section from changes in the cross sectional area of the enclosure. In the embodiments shown herein, this distinguishing operation is performed by a plurality of strain gages. The number of strain gages required on the transducer is equal to the number of sensors. As the enclosure expands and contracts radially, the sensors move radially inward or outward with the contraction or expansion. Since the sensors are attached to the frame, the frame also expands and contracts with the enclosure. A strain gage is attached to the frame adjacent each sensor; this strain gage responds to deformation of the frame by an increase in its resistance as the strain gage is elongated and a decrease as the gage is compressed.

When the enclosure is expanded by pressure, it expands at all points about its periphery and all sensors detect an expansion and transmit it to the frame. Each strain gage responds with an increase in resistance. The sum of the strain gage resistances increases in proportion to the increase in pressure. When extraneous vibrations vary the geometrical cross sectional shape of the enclosure, some sensors detect an expansion of the enclosure while others detect a contraction. Accordingly, some strain gages increase in resistance and others decrease. When the changed resistances of the strain gages are summed, it is found that the sum remains substantially unchanged from the total resistance values associated with the gages in an undeformed condition; it is not affected by extraneous vibration.

My invention is embodied in an easily attached and portable clamp which can measure the pressure exerted on an enclosure without breaking the surface of the enclosure. My invention is adjustable so as to be quickly and easily attached to various size enclosures to measure pressure thereon. It is thus particularly effective as a diagnostic tool for testing of hydraulic or pneumatic pressure systems such as those associated with water, steam, compressed air, vacuum, natural gas, or chemical lines. The invention is useful for testing automotive brake lines, and has application, too, where a remote pressure sensing device is required for locations inconvenient or unsafe for human observers such as radioactive areas or areas subject to extremes of temperature. In addition, the transducer can be used as a pressure monitor for aircraft tires, or pressure cycle counter on apparatus where material fatigue is an anticipated problem. It is also valuable for accurate pressure measurement within an accelerating vehicle.

BRIEF DESCRIPTION OF THE DRAWINGS

FIG. 6 is a cross sectional view of a square cross section enclosure showing it deformed by the "second mode" of vibration.

FIG. 7 is a front elevational view of a second embodiment of my invention showing it clamped to a square cross section enclosure.

DESCRIPTION AND OPERATION OF THE PREFERRED EMBODIMENTS

Figures 1, 3:
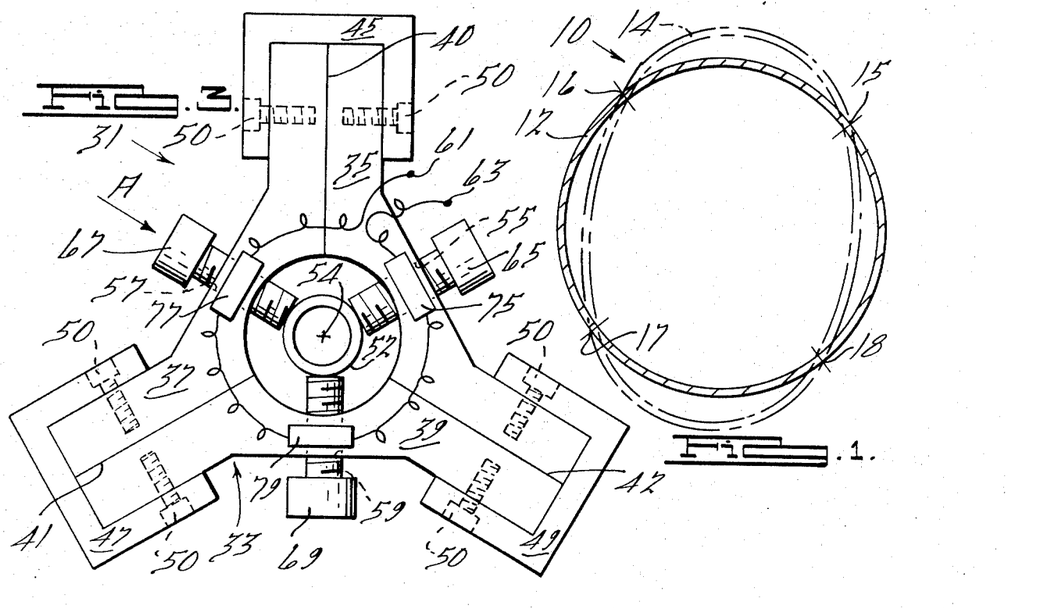
FIG. 1 is a cross sectional view of a round cross section enclosure showing the effect of the "second mode" of vibration thereon.
FIG. 3 is a front elevational view of one embodiment of my pressure responsive transducer showing it clamped to a round cross section pipe.

Two alternative embodiments of my invention are shown in FIGS. 3 and 7. FIG. 3 shows a pressure responsive transducer being used to measure the pressure exerted on the periphery of a circular cross section enclosure such as a pipe. FIG. 7 shows a second embodiment of a pressure responsive transducer being used to measure pressure changes exerted on an enclosure having a square cross section.

It should be understood that my pressure responsive transducer can be used with regular cross section enclosures possessing a wide range of cross sectional geometrical configurations. The invention will accurately respond to pressure changes exerted on an enclosure even in the presence of extraneous vibrations so long as the enclosure has a substantially regular cross section. My invention will respond accurately to pressure changes exerted on any enclosure, regardless of the enclosure's shape, if no extraneous vibrations are present on the enclosure. The term "regular enclosure" as used herein is defined as an enclosure whose cross section possesses radial symmetry about a central polar axis. The definition includes enclosures of elliptical and circular cross section; in addition, it includes enclosures having a substantially regular convex polygonal cross section. It is not essential that the sides of the polygonal cross sections be straight lines; the sides can be arcuately curved inward or outward. So long as the radial symmetry requirement is met, the efficiency of my invention will not be impaired when extraneous vibrations are present.

Throughout this disclosure, I shall often speak of my invention as being used on pipes. It should be understood, however, that it can be used on any enclosure having a regular cross section as indicated earlier.

In practice, most pipes are continually subject to extraneous vibration due to their association with moving machinery, accelerating systems, and the like. As a result, the cross sections of these pipes are continually varying in shape, causing some portions of the pipe periphery to expand while other portions contract.

Regardless of the source or cause of extraneous vibrations affecting a given pipe, the result is to deform the pipe to some degree. Ordinarily, there are many vibrations simultaneously present on a given pipe and they take the form of "waves." Each of these waves deform the pipe slightly, and the cross sectional configuration of the pipe at any given moment will be the resultant of the many waves present. For my purposes, it is not necessary to explain in great detail the nature and origin of the many types of extraneous vibrations which cause wave phenomena on an enclosure; the point to remember is that a regular enclosure, regardless of the source and cause of the vibratory waves thereon, will deform in a predictable manner.

To understand the operation of my invention, it is helpful to first consider the effects of pressure and extraneous vibrations on the cross sections of enclosures. I shall first discuss such effects on round and elliptical cross section enclosures.

MEASURING PRESSURE CHANGES IN ROUND OR ELLIPTICAL CROSS SECTION ENCLOSURES SUBJECT TO EXTRANEOUS VIBRATION

FIG. 1 shows the cross section of a round pipe 10 which is subject to the "second mode" of extraneous vibration. The circular cross section 12 is the normal cross sectional shape of the round pipe 10 when no extraneous vibrations are present on the pipe. The elliptical cross section 14 can be considered as the cross sectional shape of the same pipe 10 at a particular instant in time when deformed by the "second mode" of vibration. The amplitude of the deformation is, of course, much exaggerated for purposes of illustration. When subject to the "second mode" of vibration represented in FIG. 1 by elliptical cross section 14, the pipe 10 has two "waves" around the circumference of the pipe which act to deform the pipe to take on the shape of the waves thereon. The first of these two waves extends from point 15 through point 16 to point 17. The second wave extends from point 17 through point 18 to point 15. Each wave has its starting point at an undeformed point of the round cross section pipe; thereafter there is a region in which the pipe has been expanded radially and a second region in which the pipe has been contracted radially. I have found that the area of the expanded region is substantially equal to that of the contracted region and that the second mode of vibration thus does not alter the cross sectional area of the pipe. For the small changes in the shape of the enclosure's cross section produced by extraneous vibration, the area of the cross section remains substantially constant. Obviously, if the change in shape was very great, as for example where the enclosure cross section was permanently altered, the area of the cross section would vary. The variance produced by common vibrations, however, does not generate any substantial area change.

The amplitude of the second mode of vibration is ordinarily greater than that of any higher mode, and for that reason it is the most important mode for my purposes. It is often necessary that this "second mode" of extraneous vibration be compensated against if one is to accurately measure pressure exerted on a vibrating pipe.

Figures 2, 4, 5:
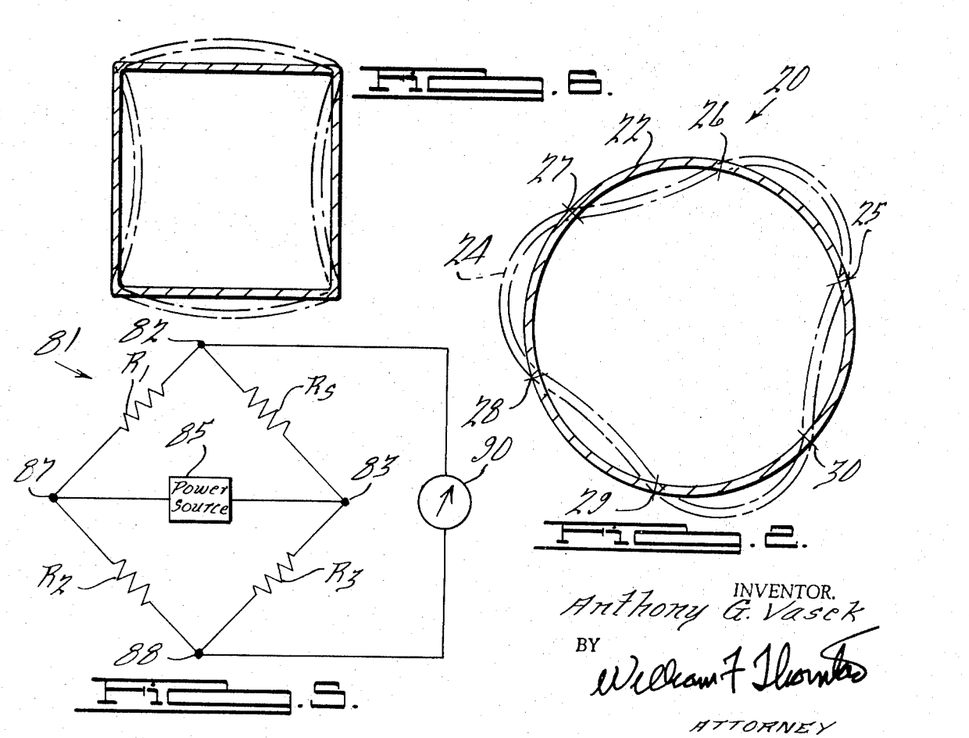
FIG. 2 is a cross sectional view of a round cross section enclosure showing the effect of the "third mode" of vibration thereon.
FIG. 4 is a side view of the transducer of FIG. 3 taken in the direction of arrow A.
FIG. 5 is a schematic circuit diagram of a Wheatstone Bridge which can be used to measure pressure with my invention.
Figure 3:
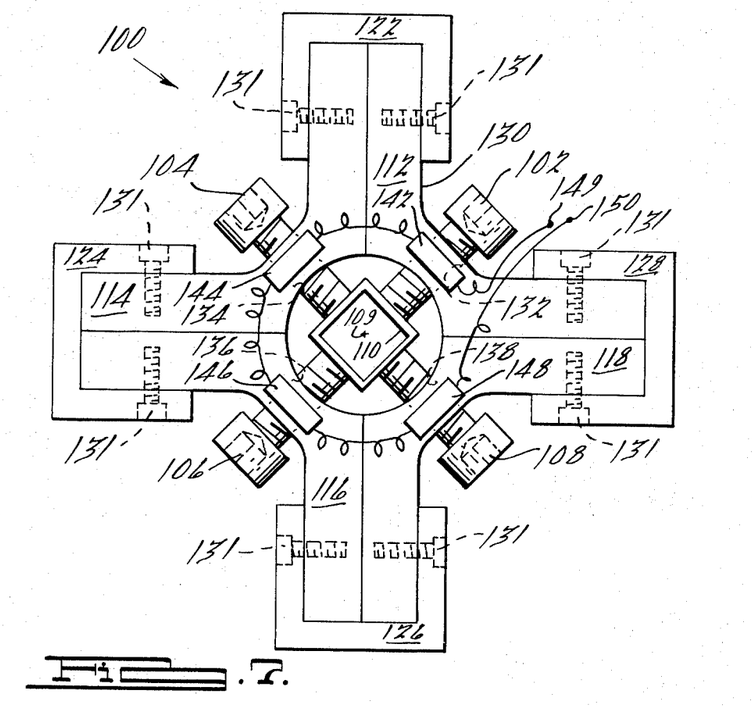
Figure 4:
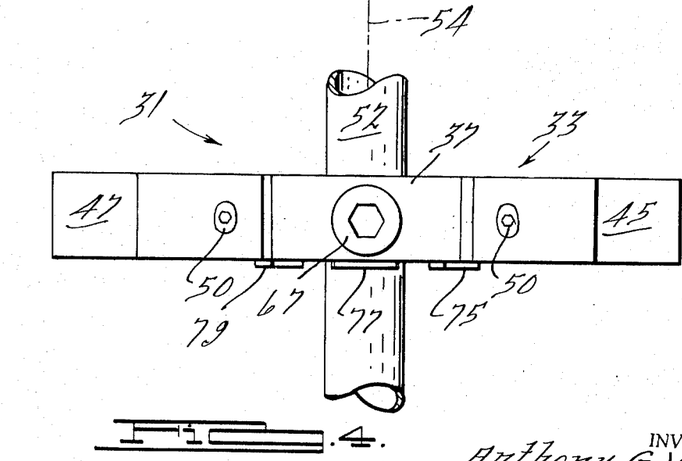

The next higher mode of vibration, known as the "third mode" has three waves about the periphery of the pipe and is shown greatly exaggerated in FIG. 2 for purposes of illustration. The amplitude of these waves, though ordinarily much smaller than the amplitude of the waves of the second mode, is often large enough to make it necessary to compensate for them if a high degree of accuracy is desired.

FIG. 2 shows a pipe 20 deformed by the "third mode" of vibration. The circular cross section 22 is the normal cross sectional shape of the round pipe 20 when no extraneous vibrations are present on the pipe. The deformed cross section 24 can be considered as the cross sectional shape of the same pipe 20 at a particular instant in time when deformed by the "third mode" of vibration. The first of three waves begins at point 25, passes through point 26, and terminates at point 27. The second begins at point 27, passes through point 28, and terminates at point 29. The third begins at point 29, passes through point 30, and terminates at point 25. Each wave has its starting point at an undeformed point of the round cross section pipe; thereafter there is a region of the wave in which the pipe 20 has been expanded radially and a second region of the wave in which the pipe has been contracted radially. As was the case with the second mode of vibration, I have found that the area of the expanded region is substantially equal to that of the contracted region and that the third mode of vibration thus does not substantially alter the cross sectional area of the pipe. The third mode of vibration, like the second mode, produces a variation in the cross sectional shape of the pipe, but does not cause any substantial change in the pipe's cross sectional area.

It should be understood that there are an infinite number of modes of vibration which can be present on a pipe. For example, the next higher mode than that shown in FIG. 2 would be the "fourth mode," and it would have four waves about the circumference of the pipe. The fifth mode would have fives waves, etc. Although in theory, one could go on compensating for an infinite number of modes of vibration to obtain an accurate pressure measurement, in practice it has been found that it is seldom necessary to compensate for more than the second and third modes of vibration pictured in FIGS. 1 and 2. This is because the amplitude of the waves associated with each mode decreases substantially with each higher mode of vibration. The only modes of vibration with amplitudes large enough to ordinarily require compensation are those shown in FIGS. 1 and 2. Naturally, for certain special purposes requiring high accuracy, it is sometimes desirable to compensate for higher modes of vibration. This can be done with my invention when desired.

It should be understood that the key to accurately measuring pressure in pipes subject to extraneous vibration is to measure changes in cross sectional area which are caused by pressure while simultaneously distinguishing variations in geometrical shape of the pipe cross section produced by extraneous vibration. The cause or causes of the extraneous vibration are not important; it is only important to distinguish variations in shape of the pipe cross section from changes in area. It is for this purpose that I designed my pressure responsive transducer which will now be described when used with round or elliptical cross section enclosures. FIG. 3 shows a front elevational view of my transducer, and FIG. 4 is a side view taken in the direction of arrow A in FIG. 3.

Referring now to FIGS. 3 and 4, a transducer indicated generally at 31 has a frame 33 formed of three substantially identical arms 35, 37, and 39. The arms 35, 37, and 39 fit closely together at junctures 40, 41, and 42 and are held in contacting relationship by three identical brackets 45, 47, and 49. These brackets are retained in position about the ends of the arms by bolts 50. It is important that each of the arms 35, 37, and 39 be substantially identical to the others used in a given transducer as will be explained further hereafter.

Holes 55, 57, and 59 are bored through the centers of arms 35, 37, and 39, respectively, and threaded to accommodate screws 65, 67, and 69, respectively. These screws act as sensors, and when placed in contact against a pipe or other enclosure they serve as sensing means. The holes through the arms should be located such that the screws therein will contact a pipe 52 at positions separated by equal polar angles. The polar axis, of course, is the axis 54 of the pipe 52. The transducer 31 is shown attached solidly to the pipe 52, by the screws 65, 67, and 69. For best results, the screws should be of substantially identical construction.

A strain gage is mounted on each arm of the transducer 31 adjacent to the screw passing therethrough. The strain gages, taken collectively, act as means for distinguishing changes in the geometrical shape of the pipe cross section from changes in its cross sectional area. It should be understood that it is possible to mount the strain gages at positions on the frame other than those shown. The positions shown in FIG. 3 are favored because they permit high sensitivity to radial expansions or contractions. The strain gage associated with a given arm should be in the same position on the arm as the strain gages associated with the remaining arms so a given expansion or contraction of the pipe when transmitted equally to all the arms of the transducer will produce an identical response from each strain gage. Because of this, the strain gages, 75, 77, and 79 are located at corresponding positions on arms 35, 37, and 39, respectively (FIGS. 3 and 4). The gages are electrically connected in series with output terminals 61 and 63.

I have found that strain gages of either resistance wire type, foil type, or semi-conductor type function efficiently with the embodiments of the invention described herein. Greatest accuracy and sensitivity are obtainable, however, with semi-conductor gages. All these gages are characterized in that their electrical resistance varies with strain. When such gages are tensioned, resistance increases; when compressed, it decreases. Resistance wire or foil strain gages have maximum resistance variations of approximately 2 to 3 percent, while the resistance of semi-conductor strain gages may change as much as 20 to 30 percent. For best results, the strain gages used with my invention should be matched gages having substantially identical electrical properties. Matched sets are readily available from strain gage manufacturers. Such matching is helpful because deformation of the arms of the transducer are to be compared by means of the changes in the electrical resistances of the gages, and accuracy can be improved by using gages which respond identically to a given deformation.

When the pressure changes within a given pipe 52 (FIG. 3) are to be measured, the transducer 31 must first be attached to the pipe. This is done by removing the bolts 50 from brackets 45 and 47 which join arm 37 to the remainder of the transducer 31. This permits one to remove arm 37 from the remainder of the transducer. The remainder of the transducer is then placed about the pipe 52 and arm 37 is again reassembled as a part of the transducer by replacing the brackets 45 and 47, and reinserting bolts 50 therein. One then secures the transducer 31 to the pipe 52 by tightening screws 65, 67, and 69 against the pipe to thereby fasten the transducer securely. The screws are tightened sufficiently to place the arms of the transducer under stress to guarantee that the screws remain in contact with the periphery of the pipe as it expands and contracts due to both extraneous vibration and pressure.

FIG. 5 shows a simplified version of a Wheatstone Bridge circuit 81 which can be used for measuring changes in the resistance of the strain gages. The combined resistances of the strain gages 75, 77, and 79 of transducer 31 are connected as $R_s$ in FIG. 5. Thus, output terminals 61 and 63 (FIG. 3) are connected to terminals 82 and 83 of the Wheatstone Bridge circuit 81 shown in FIG. 5. Next, the resistances $R_1$, $R_2$ and $R_3$ of the bridge 81 are selected to create a balanced condition of the bridge 81 when there is no pressure or vibration affecting the strain gage resistances, $R_s$. This can be done in numerous ways well known to those skilled in the art. One way to achieve this balance is to select $R_1$ and $R_2$ equal to one another and $R_3$ equal to the resistances of $R_s$ when no pressure or vibration is present on the pipe. A power source 85 is connected between terminals 87 and 83 of the Wheatstone Bridge 81 and a meter 90 connected between terminals 82 and 88 to detect any unbalanced condition of the bridge caused by pressure on the enclosure. The meter deflection will be proportional to pressure exerted on the pipe 52 (FIG. 3). The bridge circuit 81 thus serves as indicating means to produce a measurement of pressure exerted on the pipe 52.

It should be understood that means other than the meter 90 can be used in conjunction with the bridge circuit 81 for obtaining a quantitative measurement of the pressure changes on pipe 52 (FIG. 3). Such means include cathode ray oscilloscopes, strip chart recorders, magnetic tape recorders, and other means well known to those skilled in the art. Also, it will be recognized that the indicating means used for my pressure responsive transducer need not be in the form of a Wheatstone Bridge. For example, an electronic constant current source may be connected to the output terminals 61 and 63 (FIG. 3) and the changes in the voltage between the terminals 61 and 63 may be measured to obtain the pressure changes on the pipe 52. These and other variations in electrical circuitry well known to those skilled in the art can serve as indicating means and should be considered as within the scope of my invention.

Referring now to FIG. 3, an increase in the pressure exerted on the pipe 52 causes the pipe to expand radially, and all three screws 65, 67, and 69 are pushed radially outward from the pipe. Since the pressure urging the outward expansion of the pipe acts uniformly in all radial directions, each of the screws 65, 67, and 69 sense an equal pipe expansion. These equal expansions are transmitted to the arms of the transducer 31 by the screws and cause proportional deformations of the arms 35, 37, and 39. The strain gages on the arms respond to these deformations by varying their electrical resistances. Since the pipe expansions are equal, each strain gage responds identically, and depending on the exact locations where the strain gages are mounted, all are either placed in tension or compression. For purposes of explanation, I shall presume that an outward expansion of the pipe causes all strain gages to be placed in tension. When the gages are tensioned, their individual resistances increase, and thus the sum of the resistances, $R_s$, also increase. This increase in $R_s$ is measured by the Wheatstone Bridge circuit 81 of FIG. 5. The increase in $R_s$ is proportional to the increase in pressure within the pipe 52. This change in $R_s$ unbalances the bridge circuit 81 of FIG. 5, and a current flows through meter 90 to produce a meter deflection proportional to the pressure change in pipe 52. I shall next describe the behavior of the transducer 31 when the pipe is subject to the second mode of extraneous vibration shown in FIG. 1.

When the pipe 53 (FIG. 3) is deformed by two waves as shown in FIG. 1, its cross section is deformed elliptically. As a result, some screws of the transducer are forced radially outward while others move radially inward as the pipe 52 deforms (FIG. 3). The screws transmit the deformations of the pipe cross sectional shape of the arms of the transducer. The strain gage on each arm is either elongated or compressed. A gage which is elongated as a result of the pipe deformation increases its resistance. If the gage is compressed, its resistance decreases. I have found that the sum of the strain gage resistances, $R_s$, remains substantially constant when the pipe changes only its geometrical cross sectional shape and not its cross sectional area. The sum $R_s$ varies substantially only when the cross sectional area of the pipe 52 varies. Since pressure changes cause the cross sectional area to vary, it is possible to accurately measure the changes in pressure by measuring the changes in the $R_s$.

When pressure changes exerted on round or elliptical cross section enclosures are to be measured with my invention, one should first decide the degree of accuracy required. If it is necessary only to compensate for the second mode of vibration, a minimum of three sensors contacting the enclosure at points separated by substantially equal polar angles is necessary. Three sensors thus spaced will compensate for the second mode of extraneous vibration. One cannot compensate for the third mode of vibration if only three sensors are used.

The number of sensors required to distinguish area changes due to pressure from shape variations caused by extraneous vibration for round or elliptical cross section enclosures is determined by the following relationship:

$N = 1 + W$ where:

$N$ = the required number of sensors, and $W$ = the number of the highest mode of vibration for which it is necessary to compensate.

Thus, if one wishes to compensate for the second mode, three sensors are required. If one wishes to compensate for the second and third modes, four sensors are required. If the pressure within a round pipe subject to the third mode of vibration had to be measured, the embodiment of my invention shown in FIG. 7 and described further hereafter, would accurately measure the pressure. The fifth mode would require six sensors. The six sensors would, of course, compensate for the second, third, and fourth modes as well.

It should be understood that the relationship I have just described for determining the number of sensors needed for distinguishing a given mode of vibration (and all lesser modes) is applicable only when the cross section of the pipe is round or elliptical. Additional considerations must be taken into account when polygonal cross section enclosures are used with my invention, as will be discussed hereafter in detail.

Besides having the proper number of sensors it is important that the sensors be distributed about the periphery of the pipe such that they contact the pipe at positions separated by equal polar angles. In addition, it is helpful if the detectors are located in a single plane which is perpendicular to the polar axis of the enclosure. Although it is not essential that the detectors be located within a single plane or that the plane be perpendicular to the enclosure, it has been found that more accurate results can be obtained when the sensors are so located. In practice, the small shape variations in the pipe cross section produced by vibration are not substantially different over a range of positions located longitudinally on the pipe.

MEASURING PRESSURE CHANGES IN POLYGONAL CROSS SECTION ENCLOSURES SUBJECT TO EXTRANEOUS VIBRATION

The term "polygonal cross section" as used herein refers to enclosures whose cross sections are convex regular polygons. Such polygons have their sides and vertex angles equal. Thus, my invention will function well with vibrating pipes which are of triangular cross section, square cross section, pentagonal cross section, dodecagonal cross section, etc.

Most enclosures whether of round or polygonal cross section demonstrate variations in cross sectional geometrical shape when subject to extraneous vibrations. FIG. 6 illustrated the effect of extraneous vibrations on an enclosure 91 of square cross section 92 undergoing deformation caused by the second mode of vibration. It thus has two waves about its periphery. The square cross section 92 is the normal cross sectional shape of the enclosure when no extraneous vibrations are present on the enclosure. The deformed cross section 93 can be considered as the cross sectional shape of the same enclosure when deformed by the "second mode" of vibration. The amplitude of the vibration is, of course, much exaggerated for purposes of illustration. The enclosure is shown deformed by the waves so as to take on the shape of the waves. The first of these two waves extends from point 94 through point 95 to point 96. The second wave extends from point 96 through point 97 to point 94. Each wave has its starting point at an undeformed point of the square cross section enclosure. Thereafter, there is a region in which the enclosure has been expanded radially and a second region in which the enclosure has been contracted radially. As was the case for round cross section enclosures, I have found that the area of the expanded region of this square cross section enclosure is substantially equal to that of the contracted region and that the second mode of vibration thus does not alter the cross sectional area of the square cross section enclosure. It should be noted that for the small changes in the shape of the enclosure cross section produced by extraneous vibration, the area of the cross section remains substantially constant. Obviously, if the change in shape was very great, the area of the cross section would vary. The variance produced by common vibrations, however, does not generate any substantial area change.

As indicated earlier, my invention will measure pressure changes exerted on a polygonal cross section enclosure to any desired degree of accuracy. As was true for round cross section enclosures, it is important to select the proper number of sensors to obtain the desired degree of accuracy.

Referring now to FIG. 7, a transducer 100 having four sensors, namely screws 102, 104, 106 and 108 is shown clamped to a square cross section enclosure 110 like that shown in FIG. 6.

Referring now to FIG. 7, the transducer 100 has four substantially identical arms 112, 114, 116, and 118 which are held together by identical brackets 122, 124, 126, and 128 to collectively form the frame 130 of the transducer. The brackets are held in position by bolts 131.

Holes 132, 134, 136, and 138 are bored through the centers of arms 112, 114, 116, and 118, respectively, and the holes threaded to accommodate screws 102, 104, 106, and 108, respectively. The screws act as sensors, and when placed in contact against a pipe or other enclosure collectively serve as sensing means for detecting the radial expansion or contraction of the pipe cross section. The holes through the arms should be located such that the screws therein will contact an enclosure at positions separated by equal polar angles. The polar axis is, of course, the axis 109 of the enclosure 110. For best results, the screws should be of substantially identical construction.

A strain gage is mounted on each arm of the transducer 100 adjacent to the screw passing therethrough. The strain gages, taken collectively, act as means for distinguishing changes in the geometrical shape of the enclosure cross section from changes in its cross sectional area. It should be understood that it is possible to mount the strain gages at positions on the frame other then those shown. The positions shown in FIG. 7 are favored because they permit high sensitivity to radial expansions and contractions. The strain gage associated with a given arm should be in the same position on the arm as the strain gages associated with the remaining arms so a given expansion or contraction of the pipe when transmitted equally to all the arms of the transducer will produce an identical response from each strain gage. Because of this, the strain gages 142, 144, 146, and 148 are located at corresponding positions on arms 112, 114, 116, and 118, respectively. The gages are electrically connected in series with output terminals 149 and 150. These strain gages should be a matched set with identical electrical properties. Any of the types of gages described in conjunction with FIG. 3 can also be used on the embodiment of FIG. 7. The output terminals 149 and 150 are connected to terminals 82 and 83 of the Wheatstone Bridge circuit shown in FIG. 5 described earlier. The four resistances of the four strain gages, taken collectively, form $R_s$ in FIG. 5.

The principle of operation of the transducer 100 shown in FIG. 7 is substantially identical to that described for the transducer 31 of FIG. 3, and hence will not be described in further detail here.

The number of sensors required for a given polygonal enclosure is determined by the number of sides forming the polygonal cross section of the enclosure and the number of the highest mode of vibration for which one wishes to compensate. It should be noted that when polygonal cross section enclosures are used, it is not always sufficient to use a number of sensors equal to one greater than the mode of vibration. When one is working with polygonal cross section enclosures where the number of modes of vibration for which one wishes to compensate is less than or equal to the number of sides forming the polygon one uses the two following relationships:

$$N \geq 1 + W \text{ and } S/N = C \text{ for } W \leq S$$

where:
$N$ = the number of required sensors,
$W$ = the number of the highest mode of vibration for which it is necessary to compensate,
$S$ = the number of sides forming the polygonal cross section, and
$C$ = the largest integer obtainable such that $N \geq 1 + W$.

Two examples are presented below to illustrate the manner in which the number of required sensors is determined.

EXAMPLE 1

If one wishes to measure the pressure exerted on a square cross section enclosure and to eliminate the inaccuracies due to the "second mode" of vibration shown in FIG. 6, the first relationship indicates that:

$$N \geq 1 + W \text{ and } W = 2$$

so $N \geq 3$

From this computation it is known that at least three sensors are required. To determine the actual number of sensors required for the square cross section enclosure the second relationship must be considered:

$$S/N = C$$

Since $S = 4$, $$4/N = C$$

Because $N$ must be at least equal to 3, we substitute this value for $N$ in the equation. This results in:

$$4/3 = C$$

Since this produces a value of $C$ which is not an integer, it is clear that N cannot be 3; hence it must be greater than 3. One continues by trial and error to substitute likely values for $N$ until the equation is satisfied. Thus, one next tries $N = 4$. If $N = 4$, then $C = 1$. When $N = 4$, all relationships are satisfied, and one thus knows the required number of sensors is 4. It should be understood that these sensors must be located about the periphery of the enclosure and contact the enclosure at locations separated by equal polar angles. For best results, the sensors should be in a single plane which is perpendicular to the axis of the enclosure.

EXAMPLE 2

Suppose it is desired to accurately measure the pressure within an enclosure of regular octagonal cross section and compensate for the third and lesser modes of vibration. One begins by applying the relationship:

$$N \geq 1 + W$$

Since $W = 3, N \geq 4$.
We next apply the relationship:

$$S/N = C$$

Here $S = 8$,
so $$8/N = C$$

In order for $C$ to be the largest integer obtainable such that $N$ is a whole number equal to or greater than 4, $N$ must be 4. $C$ is the largest integer obtainable when $N = 4$; thus it is known that 4 is the proper number of sensors required in this example.

At times the number of modes of vibration for which one wishes to compensate on a given polygonal enclosure may be greater than the number of sides of the polygon. In such a case, the following two relationships must be used to determine the required number of sensors.

$$N \geq 1 + W, \text{ and}$$

$$N/S = D \text{ for } W > S$$

where D equals the smallest integer obtainable such that $N \geq 1 + W$.

I shall illustrate the application of these relationships by the following example.

Suppose it is necessary to compute the number of required sensors for an enclosure which has a regular polygonal cross section with 16 sides and one seeks to compensate for the eighteenth and all lesser modes of extraneous vibration. In short, this is a situation where extremely high accuracy is desired. Applying the first relationship, it is clear that $N \geq 19$. Next, since $S = 16$, the equation $$N/S = D \text{ becomes}$$

$$N/16 = D$$

At this point, we know that $N$ must be at least equal to 19. However, if $N$ is equal to 19, the second relationship is not satisfied because $D$ would be a noninteger. To make $D$ an integer, $N$ must be at least 32. If $N$ is 32, $D$ equals 2. When $D$ is equal to 2, the requirement that $D$ be the smallest integer obtainable such that $N \geq 19$ is satisfied. $D$ could never be 1 because $N$ must be at least 19, and $S$ is fixed at 16. We thus know that a total of 32 sensors are required if one is to measure the pressure within a polygonal cross section enclosure having 16 sides to the degree of accuracy where one compensates for the 18th mode. It should be understood that with 32 sensors, this transducer will compensate for all modes of vibration up to and including the 31st mode since the relations would also be satisfied if $W = 31$.

The frame of my transducer, whether used for round or polygonal cross section enclosures, can be fabricated in a number of different ways. I have found that greatest accuracy is obtained if the frame is a unitary structure without separate arms. The disadvantage to such a structure is, of course, that it must be placed over the end of a pipe in order to clamp it to the pipe. If it is possible to "break open" the pipe to attach it in this way without great inconvenience, the unitary frame is the best construction for accuracy, because minor slippages between arms are avoided with a unitary structure. Ordinarily, however, it is necessary to measure the pressure within pipes which are parts of operating systems, and it is not convenient to break open the pipe to attach such a unitary frame. Because this is ordinarily the case, I have shown my transducer with a plurality of arms which can be assembled around an enclosure without having to break into the enclosure. When the frame is fabricated with a plurality of arms, each arm of the frame should be substantially identical to the other arms. It should be understood, however, that the arms can be shaped in many different ways and need not have the exact appearance of the arms in FIGS. 3 or 7. It is desirable that the arms be identical because strain gages mounted at corresponding positions on the arms must measure the deformation of the arms, and it is important that the gages respond identically when all arms are deformed equally. If the arms were not identical, they would be deformed unequally even when the same forces acted on them.

If the frame were fabricated from a plurality of parts, one should not make the parts unlike one another. For example, it would be undesirable to fabricate the frame shown in FIG. 7 as a two-part frame where one part consisted of a single arm and the remainder of the frame was the second part. Such construction is undesirable because the parts would not deform identically in response to enclosure expansion and contraction; the unlike structures would introduce inaccuracies in the pressure measurement.

It should be understood that if my transducer is formed with a plurality of arms, I have found it desirable to have the number of arms equal to the number of sensors. In other words, when confronted with a given enclosure requiring a known degree of accuracy in pressure measurement, one begins by determining the number of sensors required for the enclosure. This number also indicates the number of arms which the transducer should possess if the frame is fabricated as a nonunitary structure. In addition, the number of required strain gages is also the same as the number of required sensors since one strain gage is mounted on each arm adjacent the location where the sensor joins the arm. The strain gages used on the frame should be matched gages having identical electrical properties. The best results are obtained with my transducer when each arm, sensor, and strain gage is matched to other like components.

Many strain gages are responsive to compression and elongation in only a single direction. The direction of alignment of the strain gages for each arm should, of course, be identical, in order to guarantee that strain gage responses are identical for a given deformation.

The sensors should always be arranged so they contact the enclosure at positions separated by equal polar angles. Thus, if ten sensors are used, the angular separation between points of contact with the enclosure would be approximately 36°.

In this disclosure I have indicated that different considerations are applicable in determining the number of required sensors if the enclosure is of polygonal cross section rather than circular cross section. Naturally, however, if a polygonal cross section enclosure has so many sides that it is essentially a circle, it can be treated as a circle and the number of sensors selected as if the cross section were indeed a circle. I have found that when the sides of a polygonal cross section are so numerous that the length of a side is small compared with a sensor, such that a sensor when tightened on the enclosure contacts two or more sides of the enclosure, one can consider the enclosure to be circular in cross section and treat it accordingly. Thus, a polygonal cross section having a very large number of sides would require a transducer with three sensors to compensate for the second mode of extraneous vibration.

The embodiments of my invention can measure pressure changes or absolute pressure having a conventional zero level, i.e., the zero level being atmospheric pressure or vacuum. To measure such absolute pressure, it is necessary, of course, to calibrate the meter 90 (FIG. 5) in appropriate units and establish a zero pressure reference level. This can be accomplished by well known calibration means.

While I have described the preferred embodiments of the present invention, it should be understood that various changes, adaptions, and modifications may be made therein without departing from the spirit of the invention and the scope of the appended claims.

Having thus described my invention, I claim:

1. A transducer for producing a response proportional to pressure exerted on the periphery of an enclosure, when the enclosure is subject to variations in geometrical shape caused by extraneous vibrations, by measuring changes in the area of the cross section of the enclosure caused by pressure comprising:
   a frame;
   a plurality of means mounted on said frame for individually sensing both changes in the area of the cross section and variations in geometrical shape of the cross section of the enclosure; and
   means responsive to said plurality of sensing means for distinguishing changes in the cross sectional area of said enclosure occasioned by pressure changes from variations in the geometrical shape of the cross section of said enclosure occasioned by said vibrations to thereby produce a response proportional to said pressure.

2. The combination according to claim 1 wherein said sensing means contacts the periphery of the enclosure at at least three positions separated by equal polar angles.

3. The combination according to claim 2 wherein said positions are located substantially within a plane intersecting the enclosure.

4. The combination according to claim 3 wherein said plane is substantially perpendicular to the periphery of the enclosure.

5. The combination according to claim 1 wherein said frame includes a plurality of connected arms and said means for sensing include a plurality of strain gages, one of said gages mounted on each of the said arms at corresponding positions on the said arms.

6. The combination according to claim 1 wherein said sensing means includes at least three screws threadedly attached to said frame such that the said screws contact the periphery of the enclosure at positions separated by equal polar angles.

7. The combination according to claim 9 wherein said frame is formed from a number of arms equal to the number of said screws.

8. The combination of claim 1 wherein each of said means for sensing yields a similar output in response to said pressure changes, said similar outputs collectively representing said pressure changes, and said means for sensing individually yield outputs which collectively combine to an essentially zero output in response to said vibrations;
   said means responsive to receiving said collective outputs and yielding an indication representative of said pressure changes independently of said vibrations.

9. The combination of claim 8 said means for sensing are symmetrically spaced around the periphery of said enclosure, and are arranged in a plane normal to the axis of symmetry of said enclosure.

10. The combination of claim 8 wherein there are a preselected number $N$ of said means for sensing, $N$ being defined by $N=1+W$
    where: $N$ = said preselected number
    $W$ = the highest mode of vibration which said vibration output is to be essentially zero 11. The combination of claim 10 wherein said means for sensing are strain gages.

12. The combination of claim 11 wherein said strain gages are equiangularily spaced about said enclosure and lie in a plane perpendicular to the axis of symmetry of said enclosure.

13. The combination of claim 8 wherein said enclosure is a polygon having S sides, and wherein there are a preselected number $N$ of said means for sensing, N being chosen consistent with the relationships $N \geq 1+W$ and $S/N = C$ for $W \leq S$
    where: $N$ = said preselected number
    $W$ = the highest mode of vibration for which said vibration output is to be eseentially zero
    $S$ = the numbers of sides of said polygon
    $C$ = the largest integer obtainable such that $N \geq 1+W$.

14. The combination of claim 14 wherein said strain gages are equiangularily spaced about said enclosure and lie in a plane perpendicular to the axis of symmetry of said enclosure.

15. The combination of claim 13 wherein said means for sensing are strain gages.

* * * * *